US010902376B2

(12) United States Patent
Zuberi et al.

(10) Patent No.: US 10,902,376 B2
(45) Date of Patent: Jan. 26, 2021

(54) INVENTORY CONTROL

(71) Applicant: Microsoft Technology Licensing, LLC, Redmond, WA (US)

(72) Inventors: Khawar Zuberi, Redmond, WA (US); Abhishek Abhishek, Sammamish, WA (US); Rouzbeh Aminpour, Bellevue, WA (US); Yasser B. Asmi, Redmond, WA (US); Zhengyou Zhang, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 15/805,038

(22) Filed: Nov. 6, 2017

(65) Prior Publication Data

US 2019/0138975 A1 May 9, 2019

(51) Int. Cl.
| | |
|---|---|
| *G06Q 10/08* | (2012.01) |
| *G08B 13/24* | (2006.01) |
| *G06Q 30/00* | (2012.01) |
| *G06Q 30/06* | (2012.01) |
| *G06K 7/10* | (2006.01) |

(52) U.S. Cl.
CPC ....... *G06Q 10/087* (2013.01); *G06K 7/10366* (2013.01); *G06Q 30/00* (2013.01); *G06Q 30/06* (2013.01); *G08B 13/2402* (2013.01)

(58) Field of Classification Search
CPC ..................................................... G06Q 30/06
USPC ......................................................... 705/28
See application file for complete search history.

(56) References Cited

U.S. PATENT DOCUMENTS

| | | | |
|---|---|---|---|
| 6,903,656 B1 | 6/2005 | Lee | |
| 7,076,441 B2 | 7/2006 | Hind et al. | |
| 10,318,917 B1 | 6/2019 | Goldstein et al. | |
| 10,339,493 B1 | 7/2019 | Famularo et al. | |
| 10,643,174 B1 | 5/2020 | Hum | |
| 2002/0170961 A1 | 11/2002 | Dickson et al. | |
| 2006/0028552 A1* | 2/2006 | Aggarwal | G01S 3/7864 348/169 |
| 2008/0110992 A1* | 5/2008 | Knowles | G07G 1/0036 235/462.14 |
| 2015/0012396 A1 | 1/2015 | Puerini et al. | |
| 2015/0019391 A1 | 1/2015 | Kumar et al. | |
| 2015/0039458 A1* | 2/2015 | Reid | G06K 9/00335 705/26.1 |
| 2019/0156082 A1 | 5/2019 | Berg et al. | |

(Continued)

FOREIGN PATENT DOCUMENTS

WO       2017029718 A1     2/2017

OTHER PUBLICATIONS

"International Serach Report and Written Opinion Issued in PCT Application No. PCT/US2018/058070", dated Jan. 4, 2019, 11 Pages.

(Continued)

*Primary Examiner* — Russell S Glass
(74) *Attorney, Agent, or Firm* — Rainier Patents, P.S.

(57) ABSTRACT

The discussion relates to inventory control. In one example, a set of ID sensors can be employed in an inventory control environment and subsets of the ID sensors can collectively sense tagged items in shared space. Data from the subset of ID sensors can indicate when a user has taken possession of an individual tagged item in the shared space.

9 Claims, 10 Drawing Sheets

(56) References Cited

U.S. PATENT DOCUMENTS

2019/0244161 A1    8/2019   Abhishek et al.

OTHER PUBLICATIONS

"RFID: Success Strategies for Apparel Retailers", Retrieved From <<https://retail.economictimes.indiatimes.com/news/industry/rfid-success-strategies-for-apparel-retailers/58838868>>, May 25, 2017, 10 pages.
Lasher, et al., "Amazon Go: Using RFID to Change the Shopping Experience", Retrieved From <<http://angsila.cs.buu.ac.th/~57160034/887492/week1/amazon.pdf>>, Retrieved on: Sep. 4, 2017, 8 Pages.
Anderson, T. J., "How RFID in Retail Is Improving Customer Experience", Retrieved From <<http://msmsolutions.com/rfid-in-retail-improving-customer-experience/>>, Oct. 5, 2016, 5 Pages.
"Non-Final Office Action Issued in U.S Appl. No. 15/887,967", dated Nov. 29, 2019, 16 Pages.
"Final Office Action Issued in U.S. Appl. No. 15/887,967", dated May 15, 2020, 19 Pages.
"Advisory Action Issued in U.S. Appl. No. 15/887,967", dated Sep. 14, 2020, 3 Pages.
"Non Final Office Action Issued in U.S. Appl. No. 15/887,967", dated Nov. 12, 2020, 24 Pages.

\* cited by examiner

INVENTORY CONTROL

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the figure and associated discussion where the reference number is first introduced.

DETAILED DESCRIPTION

This description relates to friction-free inventory control concepts. Existing inventory controls tend to be ineffective (e.g., inaccurate) and/or burdensome to users involved with them. The following description offers friction-free inventory control that can be implemented nearly seamlessly for users. These inventory control concepts can be implemented in almost any use case scenario. For purposes of explanation, the description first turns to a retail shopping scenario, followed by a health care scenario.

Traditionally, in retail shopping scenarios, inventory control has been accomplished manually by forcing the user to go through a check stand where a clerk either manually enters, or electronically scans the user's items. The user then pays the clerk for the items before leaving. Waiting in a check-out line is frustrating for shoppers and is consistently perceived as the least enjoyable part of shopping. Attempts have been made to reduce these checkout lines by utilizing self-check kiosks. However, the process still has similar pitfalls and users often end up waiting in line for a kiosk and waste time in the check-out process. Often users have trouble with the self-check process which tends to cause delay and results, once again, in longer check out times. More sophisticated attempts to provide a seamless user experience face the daunting technical challenge of unobtrusively and accurately identifying users that are in the inventory control environment and determining what inventory items individual users have in their possession.

Figure 1A:
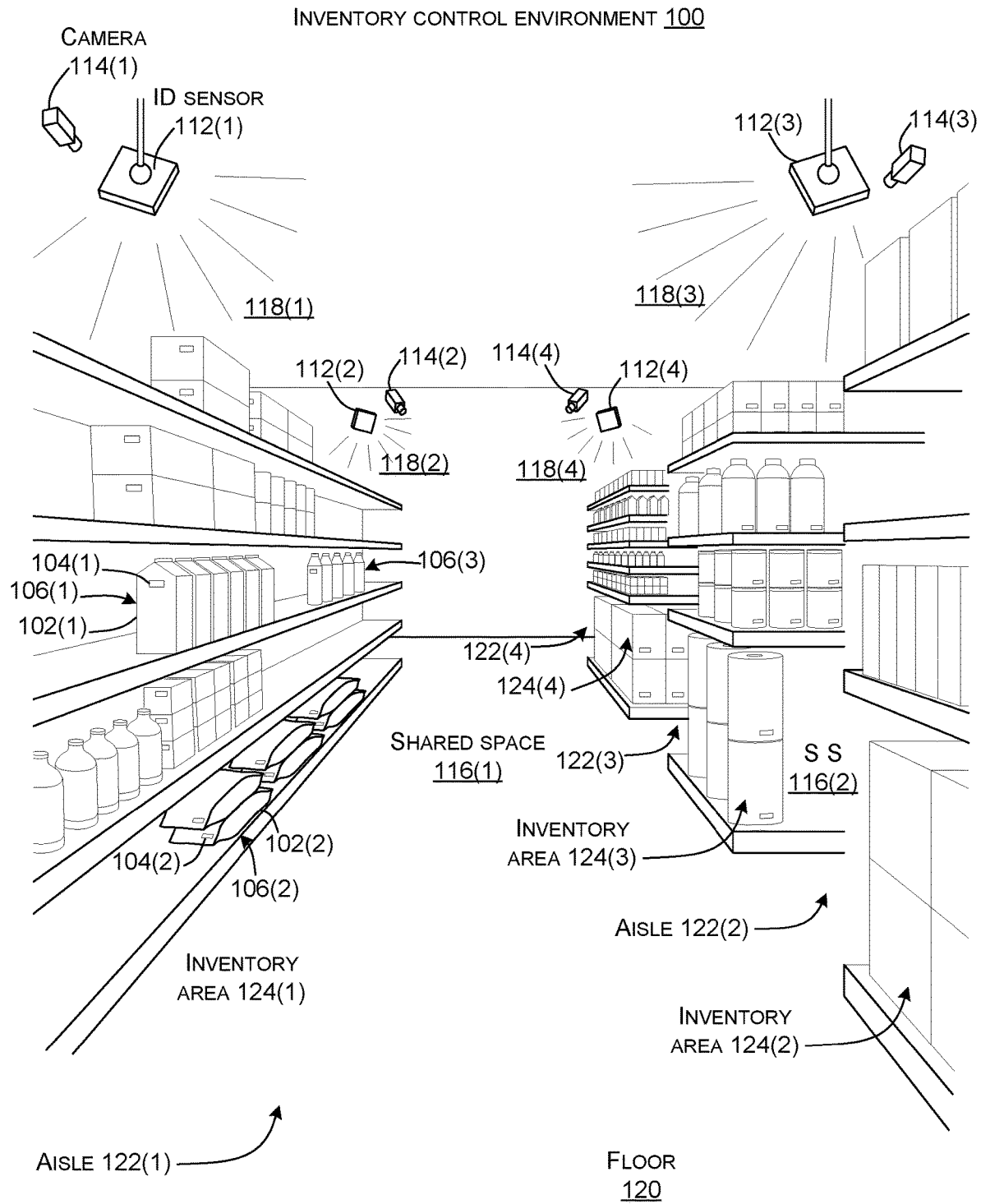
FIGS. 1A-1D collectively show an inventory control example scenario in accordance with some implementations of the present concepts.

FIGS. 1A-1D collectively show an example inventory control environment 100 that can provide a seamless shopping experience without the checkout hassle. In this case, FIG. 1A shows the inventory control environment includes inventory items 102 that are associated with ID tags 104 to create ID tagged inventory items (hereinafter, "tagged items") 106 (not all of which are indicated with specificity because hundreds of items are illustrated). In this example, the ID tags are RFID tags. Other example ID tags 104 can include near field communication (NFC) tags, among others.

The inventory control environment 100 can also include a set of ID sensors 112 and/or cameras 114. In this example, the ID sensors are RFID antennas. Other example sensors can include NFC antennas, among others. The cameras can be visible light cameras, IR cameras, and/or 3D cameras, among others.

Subsets of the ID sensors 112 can collectively sense a shared (e.g., overlapping) space 116 where tagged items 106 may be located. For instance, ID sensors 112(1)-112(4) can each sense a space 118 in front of the ID sensor, such as a cone-shaped space. Stated another way, space 118 can be the space in which RFID based ID sensors can "see" all RFID-tagged items within their range (known as RFID "interrogation zone"). Overlap of the spaces 118 defines the shared space 116. Thus, the shared space 116 can be defined as overlapping interrogation zones of a subset of ID sensors 112 in the inventory control environment 100. In the illustration of FIG. 1A, the subset of ID sensors includes ID sensors 112(1)-112(4) which define spaces 118(1)-118(4) (e.g., interrogation zones), respectively. Overlapping regions of the spaces 118 define the shared space 116(1) (e.g., shared or common interrogation zone).

Note that due to limitations of a two-dimensional drawing page, shared space 116(1) appears to be on floor 120. Actually, the shared space 116 is a three-dimensional space that can include portions of aisle 122(1) and/or inventory areas 124 (e.g., in this case shelves), among other space. As mentioned above, the inventory control environment can include multiple shared spaces. For instance, each of aisles 122 and their associated inventory areas 124 can be associated with an individual shared space 116. One such shared space 116(2) is designated relative to aisle 122(2). In the illustrated configuration, ID sensors 112(1) and/or 112(3) (along with ID sensors that are outside of the illustrated view) can sense shared space 116(2). Stated another way, an ID sensor could be associated with one subset of ID sensors to sense one shared space and another set of ID sensors to sense another shared space. Alternatively, ID sensors could be dedicated to a single shared space (e.g., ID sensors 112(1)-112(4) are dedicated to shared space 116(1).

Figure 1B:
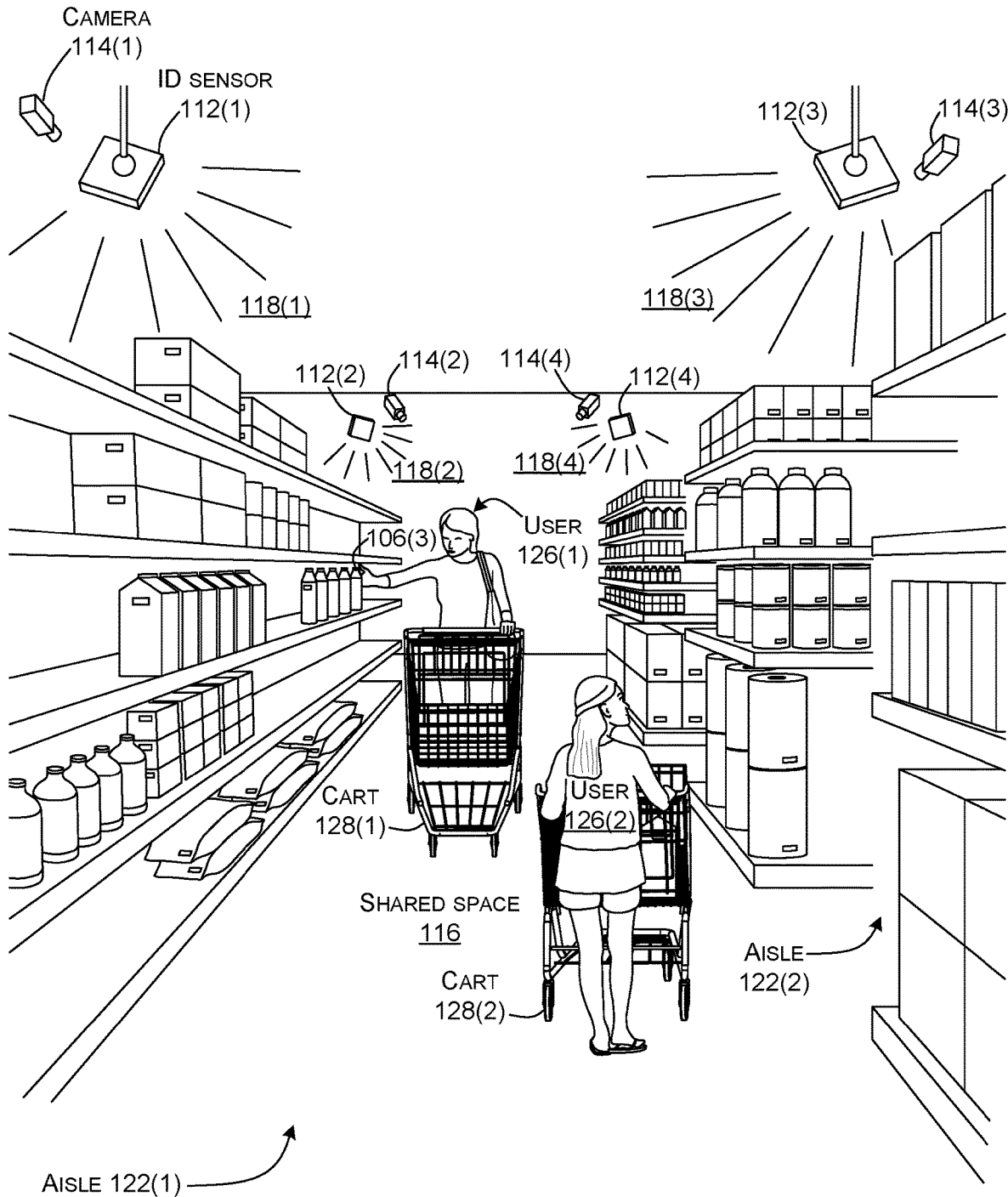
Figure 1C:
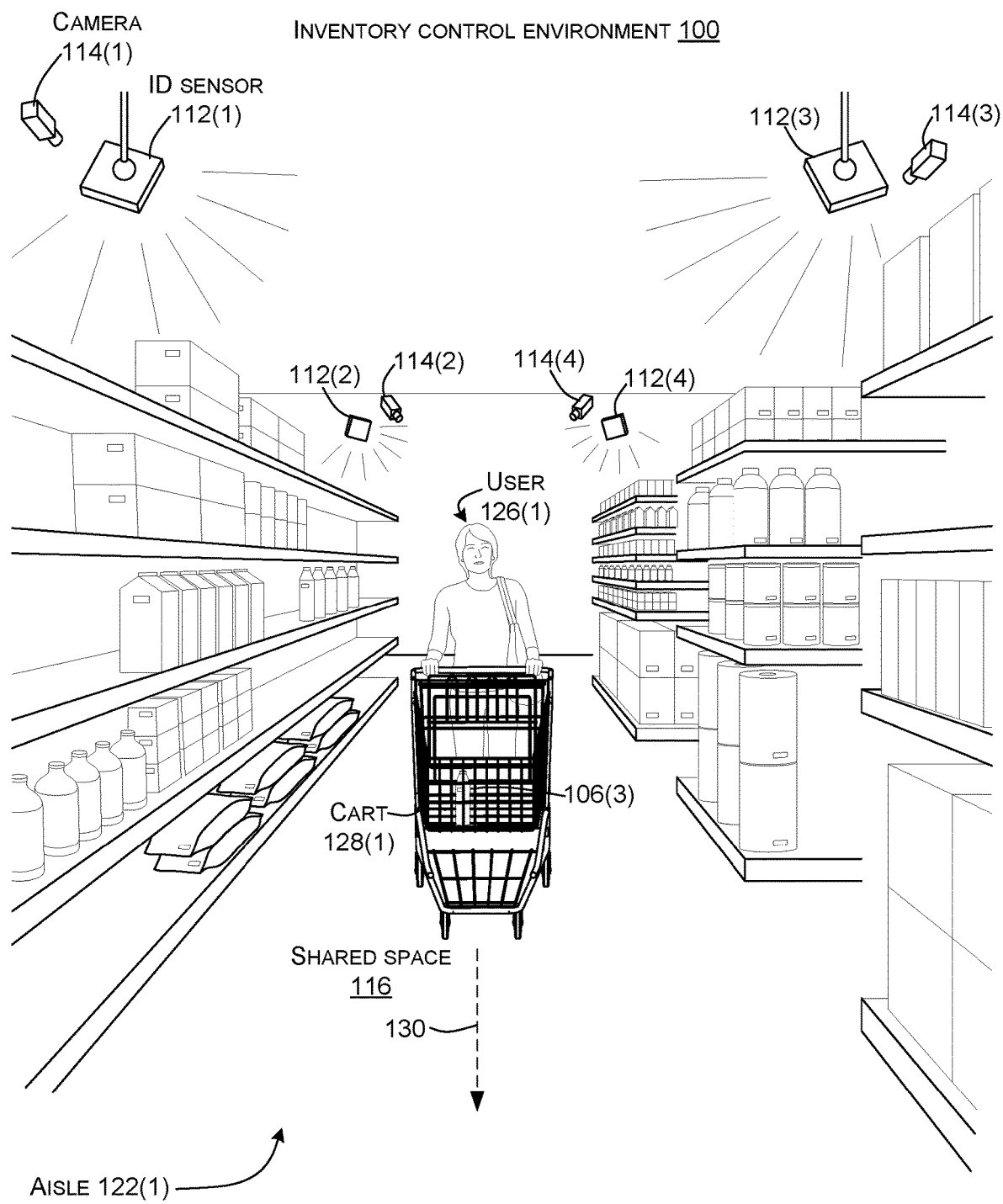

FIG. 1B shows users 126 have entered the shared space 116. In this retail shopping scenario, the users 126 are shoppers. In this implementation, cameras 114 can capture images of the users 126. The images can be used to identify the users. For instance, various biometric parameters from the images may be analyzed to identify the users. For example, face recognition can be employed to identify individual users (e.g., such as against a database of registered shoppers that have biometric data, such as pictures on file).

Other implementations may identify the individual users 126 with additional or alternative techniques. For instance, individual users may have their smart phones with them. Communications can be established with the smart phone to identify the user and the user's location can be tracked by tracking the location of the smart phone. In one example, the user may have an app on their smart phone for an entity associated with the inventory control environment. The app may include an agreement that defines conditions of use that have been approved by the user. The conditions of use may allow the entity to use the smart phone to identify and track the user when the smart phone is detected in the inventory control environment 100. The app may also define payment aspects (discussed more below).

In the inventory control environment, the users can interact with various tagged items 106 in a traditional manner. For instance, as illustrated in FIG. 1B, user 126(1) is picking up and examining tagged item 106(3) to decide whether to buy it. The user 126(1) may return tagged item 106(3) to the shelf or decide to keep it, such as by carrying it or placing it in cart 128(1). Information from ID sensors 112 of the subset (e.g., 112(1)-112(4)) and/or cameras 114 can be used to determine which user (e.g., user 126(1)) or user 126(2)) picked up the tagged item 106(3) in this example) and whether the user kept the tagged item or replaced it. For instance, looking at FIG. 1C, information from ID sensors 112(1)-112(4) can be used to determine that tagged item 106(3) is moving in a direction indicated by arrow 130. Similarly, information from cameras 114 can be used to identify that user 126(1) is moving in the same direction along arrow 130 in close proximity to the location of tagged item 106(3). In contrast, user 126(2) has turned down aisle 122(2) and is no longer visible. This co-location between user 126(1) and tagged item 106(3) can be strongly indicative of user 126(1) being in possession of tagged item 106(3). The longer (e.g., through time and/or distance) this co-location occurs the higher the likelihood of that user 126(1) is in possession of tagged item 106(3).

Figure 1D:
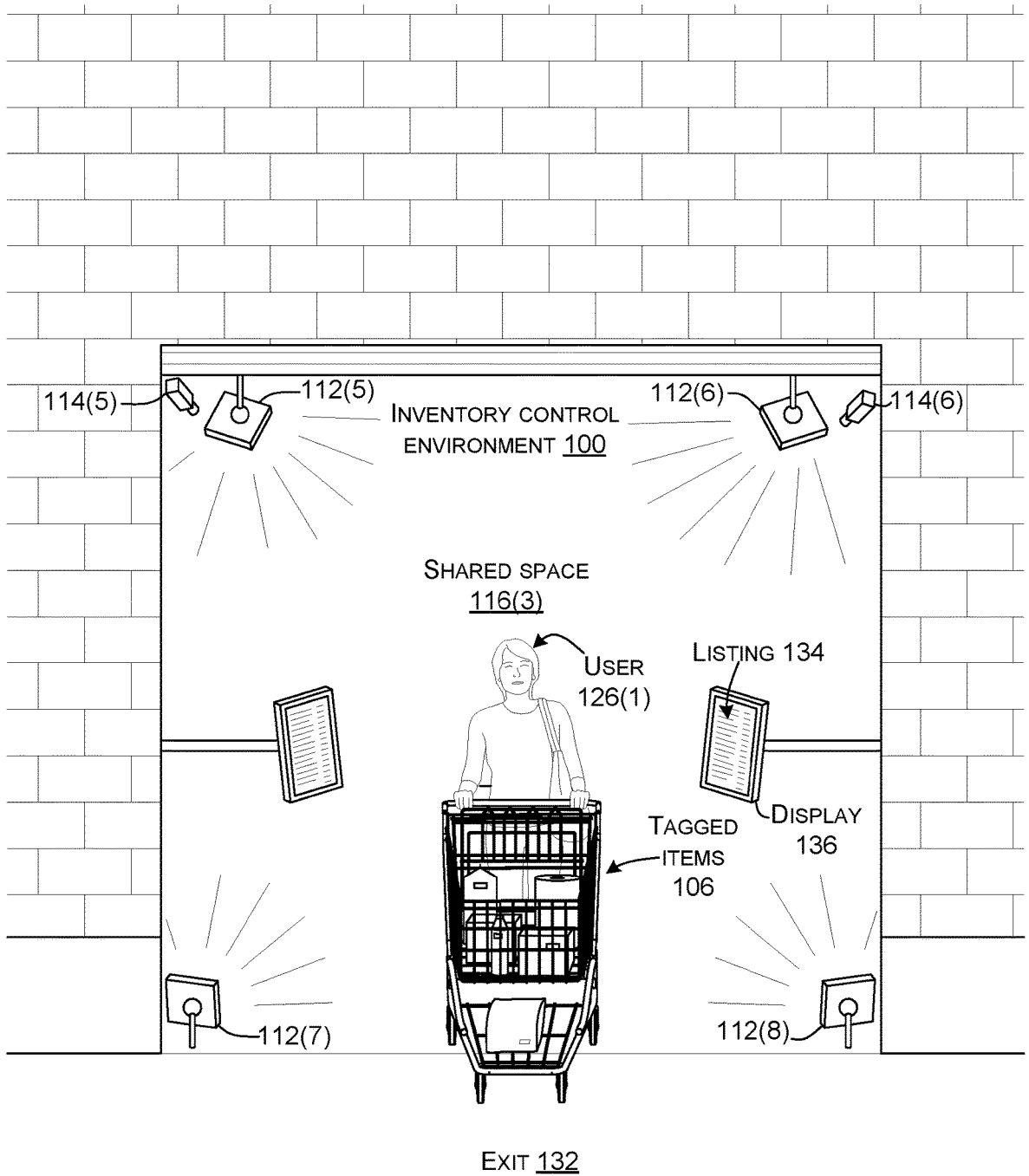

FIG. 1D shows user 126(1) in a second location of the inventory control environment 100. In this example, the second location is an exit 132 from the inventory control environment. The second location is covered by (subset of) ID sensors 112(5)-112(8) and cameras 114(5) and 114(6). The ID sensors collectively cover shared space 116(3), which is proximate to the exit. The user 126(1) is in possession of tagged items including tagged item 106(3).

An action can be taken based upon the user's possession of the tagged items at the second location. For instance, the user 126(1) can be deemed to want to purchase the tagged items 106 in their possession at the second location. The tagged items 106 in the user's possession can be verified at the second location. For instance, in this example, a listing 134 of the tagged items can be provided to the user, such as on displays 136. The user can verify the listing 134. The user can then be charged for the possessed (and verified) tagged items 106, such as on a credit card account on record for the user. The payment aspect may be defined according to conditions agreed to by the entity associated with the inventory control environment (e.g., operating entity) and the user, such as by an app on the user's smartphone. The user can continue on her way without the hassle of checkout lines and the shopping experience can be seamless from beginning to end.

Several facets of FIGS. 1A-1D are now discussed in more detail. Returning to FIG. 1A, utilizing multiple ID sensors 112 to cooperatively sense shared space 116 offers both enhanced performance and a reduced density of sensors compared to existing technologies. For instance, existing technologies dedicate a single ID sensor for each region of each shelf. This requires a high density of ID sensors; each operating at a relatively low power (e.g., small interrogation zone). For example, an order of magnitude higher number of sensors may be deployed with these existing technologies than can be utilized in the present implementations, such as the illustrated implementation shown in FIG. 1A. Further, with a single sensor sensing an inventory area 124, interference can greatly diminish accuracy of sensed information. For instance, a user walking between the ID sensor and the tagged item could diminish the signal sensed from the tagged item. Thus, a lowering of the sensed signal strength could mean that the tagged item has been moved or that a user or other obstruction is blocking the signal. In contrast, the present implementations employ multiple ID sensors 112 from different directions to sense the shared space 116 containing the tagged item 106. Moving the tagged item 106 will tend to change sensed signals from all ID sensors 112, whereas movement of users that block some ID sensors will affect those sensors, but not others and thus the two scenarios are readily distinguished.

Stated another way, identifying when a certain tagged item 106 gets picked up is technically challenging. ID sensors in the form of RFID antennas can "see" all RFID-tagged items within their interrogation zone. It is possible to adjust the transmit-power level and receive-sensitivity of antennas to enlarge or decrease the interrogation zone. So, the traditional way to detect when a tagged item has been picked up off the shelf is to configure RFID antennas to have small interrogation zones that correspond to small amounts of an inventory area 124 that includes the tagged item. This approach requires a high density of RFID antennas to be deployed throughout the inventory control environment (since each RFID antenna has a small interrogation zone), and having so many antennas is costly and not practical. Further, as mentioned above, this traditional configuration cannot reliably distinguish between movement of the tagged item and interference between the tagged item and the ID sensor (e.g., RFID antenna).

As mentioned, a core aspect employed in at least some of the present implementations is using the RFID tag's signal strength as measured by multiple physically spaced-apart ID sensors 112 to determine what is happening to an individual tagged item 106, such as when it is picked up off the inventory area 124 (e.g., shelf, rack, etc.). However, due to a number of reasons, this is not as simple as waiting for the signal strength to change by a certain delta, and then considering the item to be picked up. This is because signal strength changes under normal conditions due to factors such as (1) a human walking between the tagged item and the RFID antenna, (2) other objects around a given tagged item being moved around, (3) proximity of metal (e.g., steel shelves and/or shopping carts) around the tagged items being tracked, since metal causes reflections and that affects signal strength, etc. For instance, due to the above factors, one tagged item can be physically closer to an antenna but have a lower signal strength compared to another tagged item which is physically farther away.

One potentially key aspect that can be employed in the present implementations can overcome this ambiguity. This aspect is identifying determinative events in the inventory control environment and utilizing those determinative events as markers to study the data from the ID sensors. For purposes of explanation consider again FIGS. 1A-1C. ID sensors 112(1)-112(4) are transmitting and receiving return signals from the tagged items 106. The transmitted and received signals can be saved (e.g., recorded).

As mentioned, the received signal strengths can go up and down as shoppers come and go, etc. Assume that the received signals are greater than zero (0.0) and less than one (1.0). For instance, (in a simplified example relating to two of the ID sensors with sensed values saved every five seconds) ID sensor 112(1) may receive signal strengths of 0.5, 0.5, 0.3, 0.6 from tagged item 106(3) and ID sensor 112(2) may receive signal strengths of 0.6, 0.4, 0.3, 0.2 from tagged item 106(3). Then suddenly the signal strength for tagged item 106(3) is zero for all ID sensors in the subset (e.g., sensors 112(1)-112(4)). The zero value can be determinative that the tagged item 106(3) has been removed from the shared space 116(1). A confirmation of the determinative event may occur if another subset of ID sensors sensing another shared space (such as adjacent shared space 116(2) of FIG. 1A and/or shared space 116(3) of FIG. 1D) suddenly start receiving signals from tagged item 106(3) when none were received previously. Based on the occurrence of the determinative event, the stored signals from sensors 112(1)-112(4) can be reviewed to determine what happened to tagged item 106(3). Patterns associated with the user taking possession of the tagged item can be identified in the sensor data leading up to the determinative event. Going forward those patterns can be used with sensor data in real-time to identify when a user takes possession of an individual tagged item.

Continuing with the above simplified example, starting 20 seconds before the determinative event, the signal strength at ID sensor 112(1) was 0.5 and the signal strength at ID sensor 112(2) was 0.6, at 15 seconds before the determinative event, the signal strength at ID sensor 112(1) was 0.5 and the signal strength at ID sensor 112(2) was 0.4, at ten seconds before the determinative event, the signal strength at ID sensor 112(1) was 0.3 and the signal strength at ID sensor 112(2) was 0.3, at five seconds before the determinative event, the signal strength at ID sensor 112(1) was 0.6 and the signal strength at ID sensor 112(2) was 0.2.

Examining this sensed data can correlate to an unobstructed aisle at 20 seconds, followed by user 126(1) entering the far end of the aisle at 15 seconds. The user 126(1) partially blocks the path between tagged item 106(3) and ID sensor 112(2), thereby causing a drop in the sensed value at ID sensor 112(2), but not at ID sensor 112(1). The user picking up tagged item 106(3) at five seconds causes a drop at both ID sensors 112(1) and 112(2). When the user places the tagged item 106(3) in her cart 128(1) and continues down the aisle 122(1), her body and the cart decrease the signal received by ID sensor 112(2) from tagged item 106(3), while ID sensor 112(1) receives a relatively strong signal. The sensed values are all between 0.2 and 0.6 and without context are not particularly indicative of what is happening to the tagged item. However, when analyzed in light of the determinative event that the tagged item was removed from the shared space at time zero can allow patterns in the sensed data to be identified.

The identification of these patterns can be further assisted and/or confirmed by other processes in the inventory control environment. For instance, in the above scenario, ID sensors 112(1)-112(4) can provide additional information relating to tagged item 106(3). This additional information can include determining relative motion of tagged items using Doppler shift. (Continuing with the above simplified example only ID sensors 112(1) and 112(2) are discussed). At 20 seconds, Doppler shift analysis can indicate that tagged item 106(3) is stationary (e.g., not moving toward ID sensor 112(1) or ID sensor 112(2)). At time zero (FIG. 1C), Doppler shift analysis can show the tagged item 106(3) moving toward ID sensor 112(1) and away from ID sensor 112(2). Further, 3D imaging from cameras 114 can correlate the movement of tagged item 106(3) with movement of user 126(1) and not with user 126(2) (who is moving down aisle 122(2) and is out of view). Thus, the above information can indicate that user 126(1) picked up tagged item 106(3), placed it in her cart, and continued down the aisle with the tagged item. This correlation can be reinforced as user 126(1) continues through other shared spaces of the inventory control environment 100, such as shared space 116(2) of FIG. 1A and/or shared space 116(3) of FIG. 1D.

FIG. 1D also provides an additional verification aspect to the correlation established above between user 126(1) and tagged item 106(3). In this example, user 126(1) is presented with listing 134 of tagged items 106 that have been identified as being in her possession. As part of a check out process, user 126(1) can check the listing 134 and expressly verify the accuracy of the listing (or identify errors). The user could also specify and/or approve payment, such as by clicking on a 'credit card' icon and a 'purchase' icon on the listing 134. The verified information can be used to negate inaccurate pattern detection and ensure that patterns identified from the sensed data from the shared space are accurate.

As the accuracy or confidence of correlations between which users are in possession of which tagged items, the verification process can be reduced (e.g., streamlined) and/or eliminated altogether. For instance, when the confidence satisfies a defined threshold, the verification process can be eliminated and the user can simply walk out of the inventory control environment 100 with their tagged items. In the shopping scenario, the user can be automatically charged for the tagged items in their possession when they leave the inventory control environment without having to wait in checkout lines and/or verify their purchase. Potentially more importantly, the sensed data and its patterns can now be used as training data so that future instances where a user takes possession of a tagged item can be identified in real-time from the sensor data.

Stated another way, at least some of the present implementations can employ two stages. The first stage can utilize determinative events as triggers to identify periods of interest of sensed data from the shared spaced. For instance, the period of interest may be a one-minute time window (e.g., time period) directly preceding the determinative event. For example, in the above shopping scenario, users 126 with their carts 128 may walk through shared space 116(1) for twenty minutes without picking up tagged item 106(3). Yet, during this twenty minutes, sensed data values may increase and decrease. However, analyzing the sensed values does not provide meaningful information (e.g., the variations are essentially noise). However, if a determinative event is identified at 21 minutes (e.g., the tagged item is no longer in shared space 116(1) as indicated by all sensed values going to zero), then the sensed data in the directly preceding window of time can be useful to analyze.

As mentioned above, the present inventory control concepts can be employed in many use case scenarios. For instance, the inventory control concepts can be employed in a health care setting. For example, assume that the inventory control environment includes inventory areas, such as in a pharmacy, and a patient care area, and that both of these areas are covered by ID sensors that create shared spaces throughout the inventory control environment. Assume, that a user (e.g., health care provider) such as a doctor prescribes a prescription medicine for the patient in room '814' and enters this information into an inventory control/tracking system. The prescription medicine can be maintained in the inventory control environment as a tagged item 106. Another health care provider, such as a nurse can enter shared space 116 to retrieve the prescription medicine. (This could occur directly or another health care provider, such as a pharmacist, may retrieve the prescription medicine and transfer it to the nurse). In either scenario, information from ID sensors can identify that a user is now in possession of the prescription medicine, which health care provider possesses the prescription medicine, and/or the location of the prescription medicine within the health care facility.

Now assume that the nurse accidentally transposes the room number and enters a shared space of patient room '841' with the tagged item 106 (e.g., prescription medicine) rather than a shared space of patient room '814.' In such a case, within the inventory control environment, a location of an individual inventory control item has been identified and the location has been correlated to an individual (identified) user (this user is in possession of the tagged item). As a result, actions can be automatically taken to prevent the prescription medicine from being administered to the wrong patient. For instance, an alarm could be set off and/or a notice, such as a page or a text, could be sent the nurse and/or the nurse's supervisor. Thus, without any user involvement or hassle, the inventory control environment can determine the location of tagged items and who is in possession of individual tagged items.

Example Methods

Several inventory control methods are now described. As mentioned above, it can be difficult to discern useful information from the ID sensors in the inventory control environment. These methods can overcome these difficulties and identify when user's take possession of tagged items in the inventory control environment.

Because signal strength is affected by the operating environment and operating conditions (which can be different in different places within the inventory control environment), some of these methods can auto-recognize the signal strength patterns which indicate that a tagged item has been picked-up off the shelf, and ignores other patterns of changes in signal strength. These methods are explained relative to the shopping scenario of FIGS. 1A-1D, and are applicable to other use case scenarios.

Figure 2:
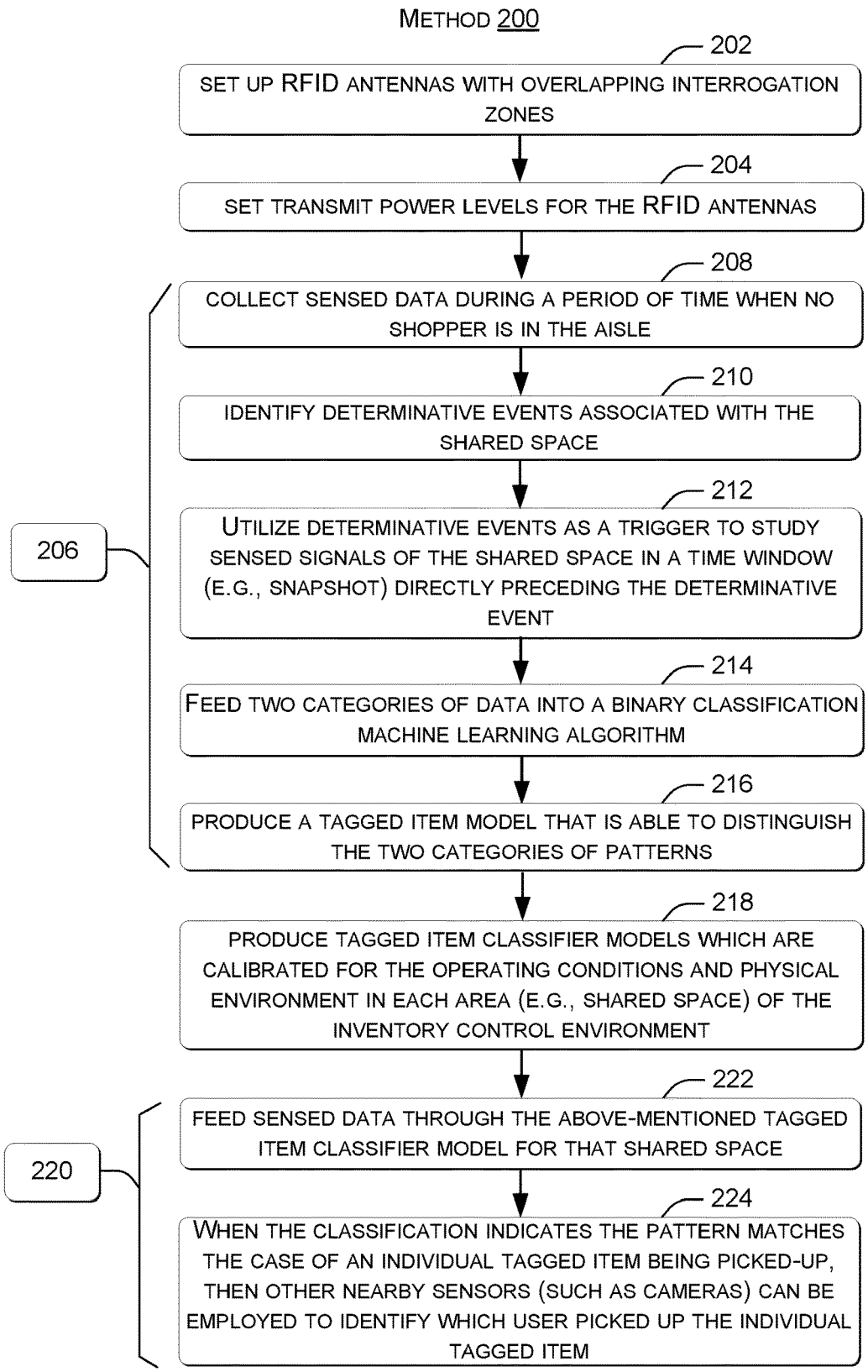
FIGS. 2-6 show flowcharts of example methods that can implement some of the present concepts in accordance with some implementations.

FIG. 2 illustrates a flowchart of an inventory control technique or method 200. This example can set up RFID antennas with overlapping interrogation zones at block 202. In some of these implementations, RFID antennas can be configured to have a large interrogation zone, e.g., large enough to cover 10-15 feet of an aisle, for instance. The use of relatively large interrogation zones, can make it feasible to have more than one RFID antenna monitoring the shared space (e.g., 2 or 3 antennas may monitor 15 feet of an aisle, for instance).

This example can set transmit power levels for the RFID antennas at block 204. In some versions, each antenna can scan at a single transmit power and receive-sensitivity levels for a given time period, such as one-tenth of a second or one second, for example. Alternatively, each antenna can scan at varying transmit-power and receive-sensitivity levels for a given time period. For purposes of explanation assume that each antenna scans at low, medium, and max power. With the above setup, tagged items in a given inventory area (e.g., shelf) in the shared space can be monitored by multiple RFID antennas and at multiple power levels. Alternatively or additionally, to different power levels, the RFID antennas can transmit at a single frequency or multiple frequencies.

This example can begin self-calibration mode at block 206.

In self-calibration mode, the method can collect sensed data during a period of time when no shopper is in the shared space (e.g., the aisle) at block 208. For instance, this data collection can be done when cameras 114 detect that the shared space is empty. This gives patterns of variation of signal strength for the case when tagged items are on the shelf in the shared space.

Next, the example can identify determinative events associated with the shared space at block 210. One determinative event mentioned above is removal of tagged items from the shared space. In such a case, the ID sensors of the shared space would all return very low values (e.g., essentially zero).

The determinative events can be used as a trigger to study sensed signals of the shared space in a time window (e.g., snapshot) directly preceding the determinative event at block 212. For example, the method can examine the pattern of RFID tag signal strength variations for few minutes prior to that event. Recall that as mentioned above, that sensed data associated with the shared space can be continually stored. The stored signals from the time window can be retrieved and analyzed to identify patterns associated with the tagged item being picked up. This snapshot can include patterns of signal strength as seen by all the RFID antennas covering that shared space, and at all the variations of scanning power.

It is worth noting that there may be cases where a shopper picks up an item but stays within the shared space for some time (even several minutes) as they either read product information on the item, or look at another product in the same area of the store, etc. This is why the method can employ a snapshot of several minutes of history to have high confidence that the captured history includes the time when the object was actually picked up off the shelf. There may be some cases in which the shopper stayed in the same area for an unusually long period of time, but as long as such instances are relatively rare (percentage wise), the solution is robust enough to not be adversely affected by such instances.

At block 214, the above two categories of data (i.e., signal strength patterns when tagged items are on the shelf, and signal strength patterns for the cases when tagged items were picked up off the shelf) can be fed into a binary classification tagged item motion machine learning algorithm (e.g., a linear regression algorithm, or neural-network-based non-linear classification algorithm). The tagged item motion machine learning algorithm can produce a tagged item motion model that is able to distinguish the two categories of patterns at block 216 for the shared space.

The above aspects (e.g., blocks 206-216) can be performed for each area (e.g., each shared space) of the inventory control environment covered by a subset of RFID antennas. This aspect can produce tagged item motion models which are calibrated for the operating conditions and physical environment in each area (e.g., shared space) of the inventory control environment at block 218.

Now the method can enter a normal operating mode at block 220. Patterns of signal strength as seen by antennas covering an individual shared space of the inventory control environment, are fed through the above-mentioned tagged item classifier model for that shared space at block 222. When the classification indicates the pattern matches the case of an individual tagged item being picked-up, then other nearby sensors (such as cameras) can be employed to identify which user picked up the individual tagged item at block 224.

Thus, this method can utilize multiple RFID antennas sensing a shared space. A determinative event can be used as a trigger to identify interesting periods of time (e.g., when the user picked up the tagged item) to examine the sensed data from the shared space. Machine learning can be used to identify patterns of signals (sensed data from the interesting periods of time) which indicate tagged items being picked up off the shelves. The present method can make this approach feasible in a cost-effective way without manually calibrating the RFID sensors for each shared space within each inventory control environment.

Figure 3:
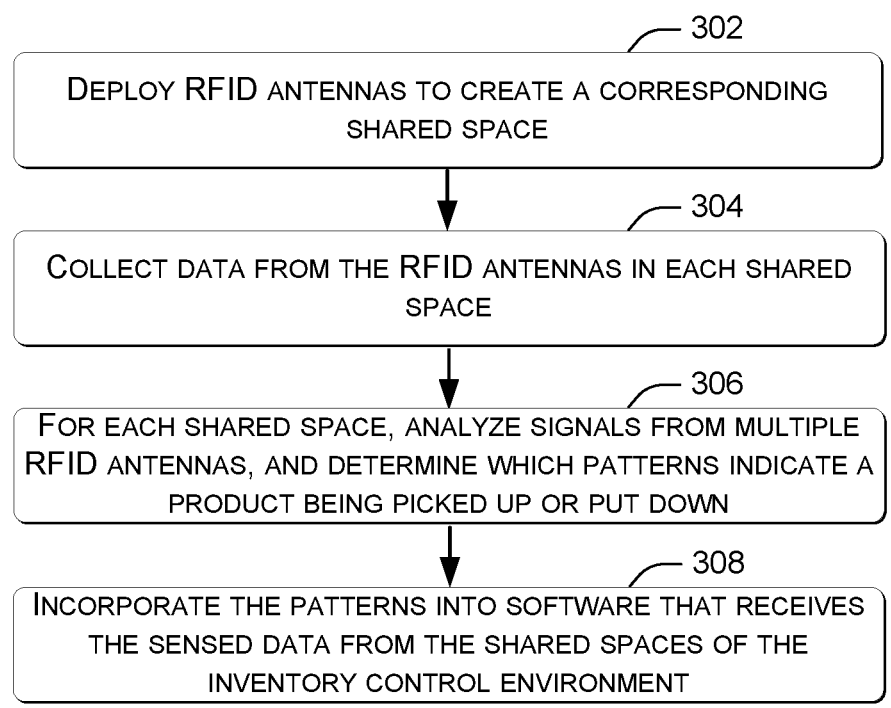

FIG. 3 illustrates a flowchart of an inventory control technique or method 300. This inventory control method can be achieved without machine learning. In this case, for each section of a given retail store with a particular physical layout (e.g., section with shelves/aisles, section with apparel racks, section with freezers, etc.), the method can deploy RFID antennas to create a corresponding shared space at block 302. Next, the method can collect data from the various RFID antennas in each shared space at block 304.

For each shared space, at block 306 the method can analyze signals from multiple RFID antennas, and determine which patterns indicate a product being picked up or put down. For instance, in one shared space, the pattern for pickup may be: signal-strength of tags reported by antenna #1 decreases by 10 dB, signal strength reported by antenna #2 increases by 15 dB, and signal strength reported by antenna #3 increases by 10 dB.

In another shared space, the pattern may be: signal-strength of tags reported by antenna #1 increases by 10 dB, signal strength reported by antenna #2 decreases by 15 dB, and signal strength reported by antenna #3 is unchanged.

These patterns can be incorporated into software that receives the sensed data from the shared spaces of the inventory control environment at block 308. The method can now run in a similar fashion to method 200 described above. If there is a change in physical layout of the inventory control environment (e.g., some shelves get moved, a new product display gets setup, etc.), then these blocks (e.g., 302-306) can be repeated to identify new patterns. The new patterns can replace the existing patterns in the software for that inventory control environment of block 308.

Figure 4:
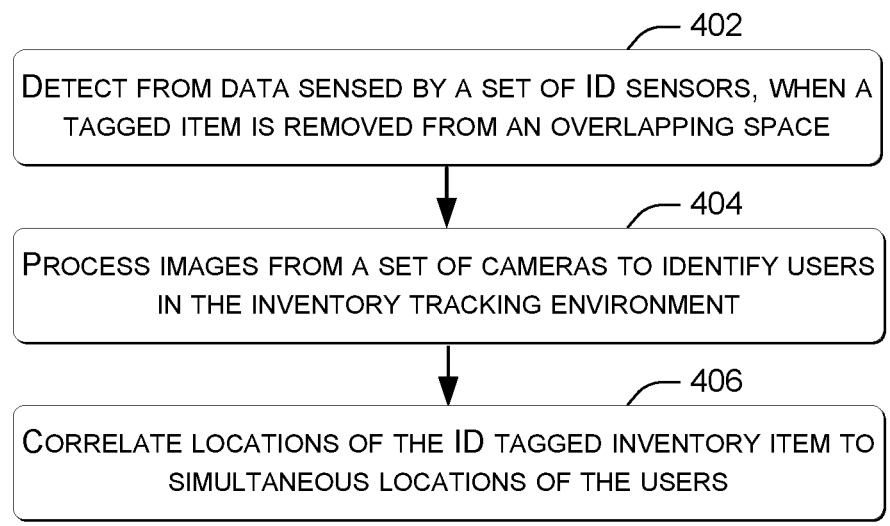

FIG. 4 illustrates a flowchart of an inventory control technique or method 400.

At block 402, the method can detect from data sensed by a set of ID sensors, when a tagged item is removed from a shared or overlapping space. For instance, a machine learning tagged item motion algorithm can operate on the stored data. The tagged item motion machine learning algorithm can be trained with verified instances where users removed tagged items from the shared space. In one case, the verification is achieved as part of a check-out process from the inventory control environment.

At block 404, the method can process images from a set of cameras to identify users in the inventory tracking environment.

At block 406, the method can correlate locations of the ID tagged inventory item to simultaneous locations of the users. In one example, direction of movement and/or locations of the ID tagged inventory item can be tracked using the Doppler shift to determine whether the ID tagged inventory item is moving toward or away from an individual ID sensor.

Figure 5:
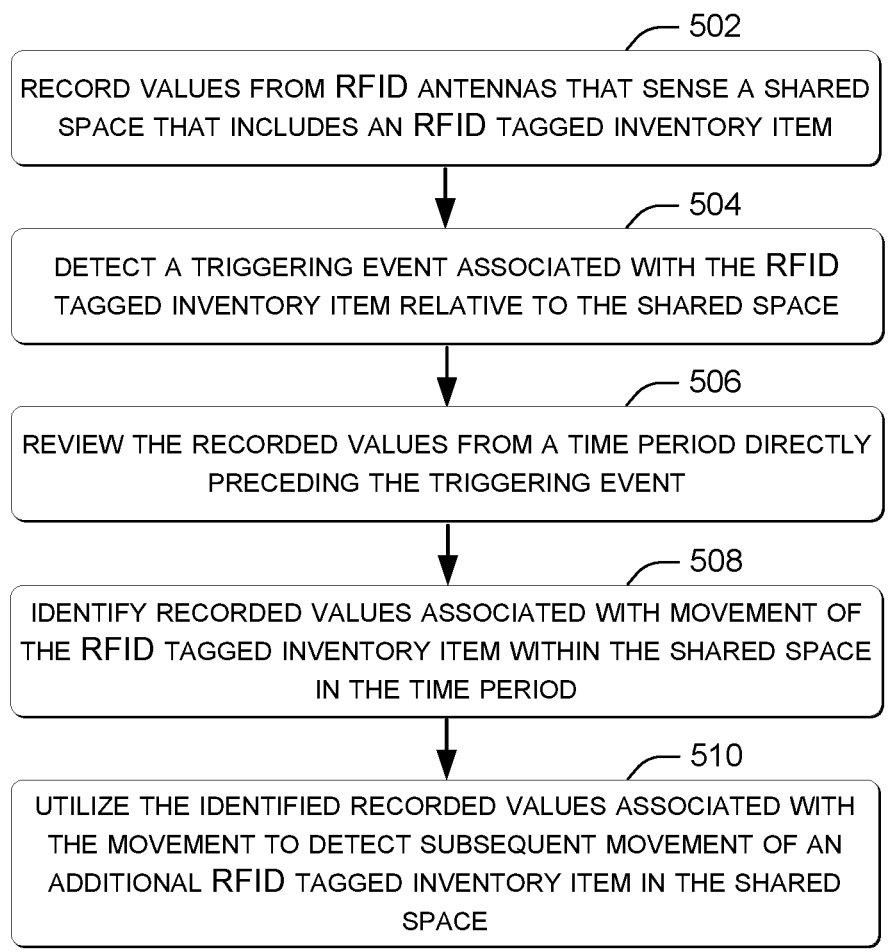

FIG. 5 illustrates a flowchart of an inventory control technique or method 500.

At block 502, the method can record values (e.g. sensed data) from RFID antennas that sense a shared space that includes an RFID tagged inventory item.

At block 504, the method can detect a triggering event associated with the RFID tagged inventory item relative to the shared space. For example, the triggering event can be an absence of the RFID tagged inventory item from the shared space. Alternatively or additionally, the triggering event is detection of the RFID tagged inventory item in a second different shared space At block 506, the method can review the recorded values from a time period directly preceding the triggering event.

At block 508, the method can identify recorded values associated with movement of the RFID tagged inventory item within the shared space in the time period. For example, identifying recorded values associated with movement of the RFID tagged inventory within the shared space can entail detecting when a user picks of the RFID tagged inventory item and returns the RFID tagged inventory item and detecting alternatively when the user picks up the RFID tagged inventory item and adds the RFID tagged inventory item to a physical shopping cart associated with the user. Alternatively or additionally, detecting can entail detecting movement of the user and the RFID tagged inventory item out of the shared space At block 510, the method can utilize the identified recorded values associated with the movement to detect subsequent movement of an additional RFID tagged inventory item in the shared space. For example, the identified recorded values associated with the movement can be utilized as training data for a tagged item machine learning algorithm that detects the subsequent movement of an additional RFID tagged inventory item in the shared space. In another example, the identified recorded values associated with the movement can be utilized to pattern match with values from RFID antennas during the subsequent movement of the additional RFID tagged inventory item in the shared space.

Figure 6:
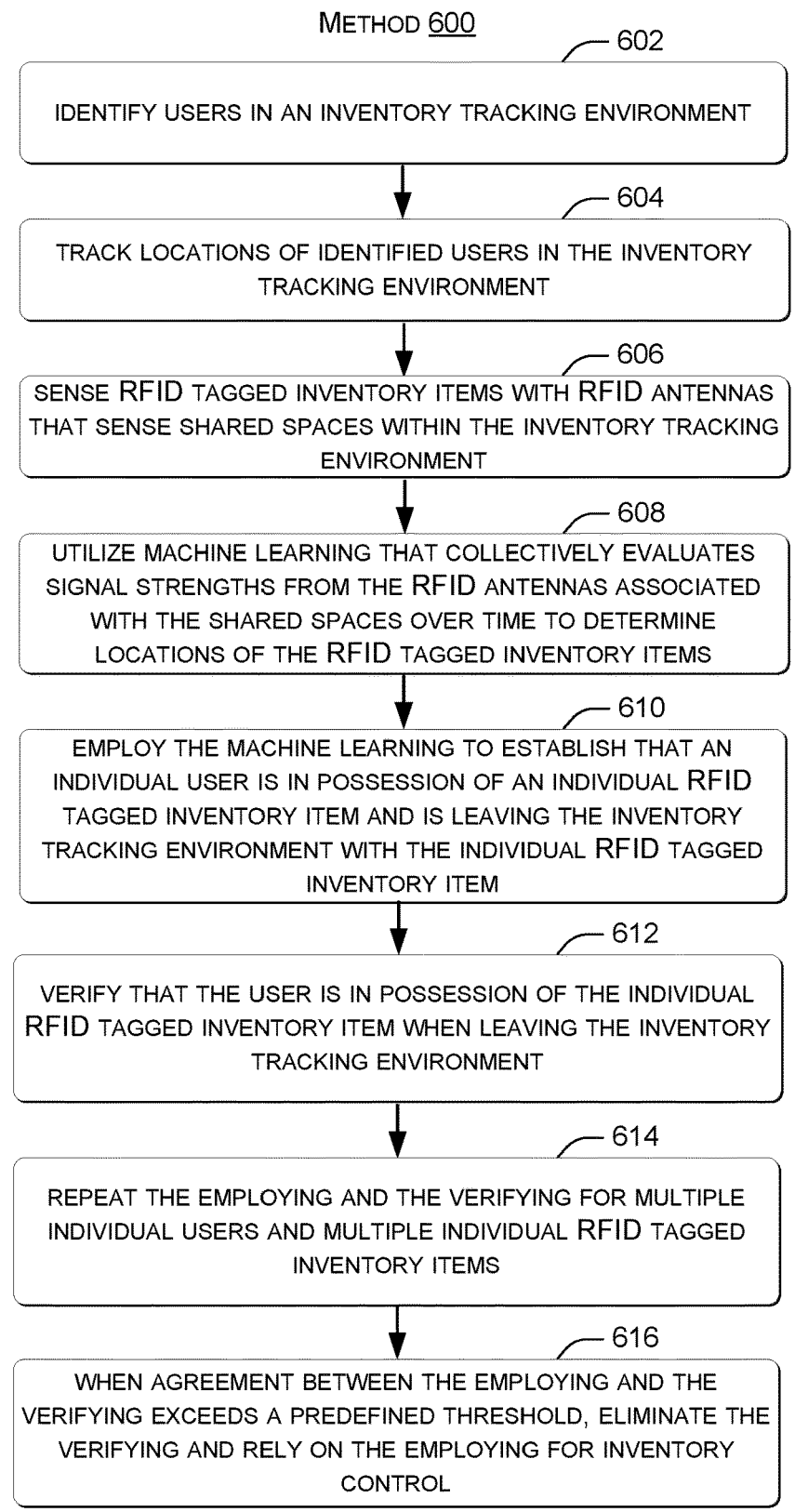

FIG. 6 illustrates a flowchart of an inventory control technique or method 600.

At block 602, the method can identify users in an inventory tracking environment. In one example, identifying can entail identifying the users by communicating with devices associated with the users. These devices can employed at checkout (e.g., may have an app that facilitates check-out).

At block 604, the method can track locations of identified users in the inventory tracking environment.

At block 606, the method can sense RFID tagged inventory items with RFID antennas that sense shared spaces within the inventory tracking environment.

At block 608, the method can utilize machine learning that collectively evaluates signal strengths from the RFID antennas associated with the shared spaces over time to determine locations of the RFID tagged inventory items. In some cases, repeating the employing and the verifying can provide training data from the machine learning. In some case utilizing machine learning can distinguish movement of the RFID tagged inventory items when the users pick up the RFID tagged inventory items and return the RFID tagged inventory items from movement of the RFID tagged inventory items when the users pick up the RFID tagged inventory items and leave the shared spaces with the RFID tagged inventory items.

At block 610, the method can employ the machine learning to establish that an individual user is in possession of an individual RFID tagged inventory item and is leaving the inventory tracking environment with the individual RFID tagged inventory item.

At block 612, the method can verify that the user is in possession of the individual RFID tagged inventory item when leaving the inventory tracking environment. In one example, verifying can be accomplished by checking out the user at a check stand or kiosk.

At block 614, the method can repeat the employing and the verifying for multiple individual users and multiple individual RFID tagged inventory items.

At block 616, the method can, when agreement between the employing and the verifying exceeds a predefined threshold, eliminate the verifying and rely on the employing for inventory control.

The described methods can be performed by the systems and/or elements described above and/or below, and/or by other inventory control devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Figure 7:
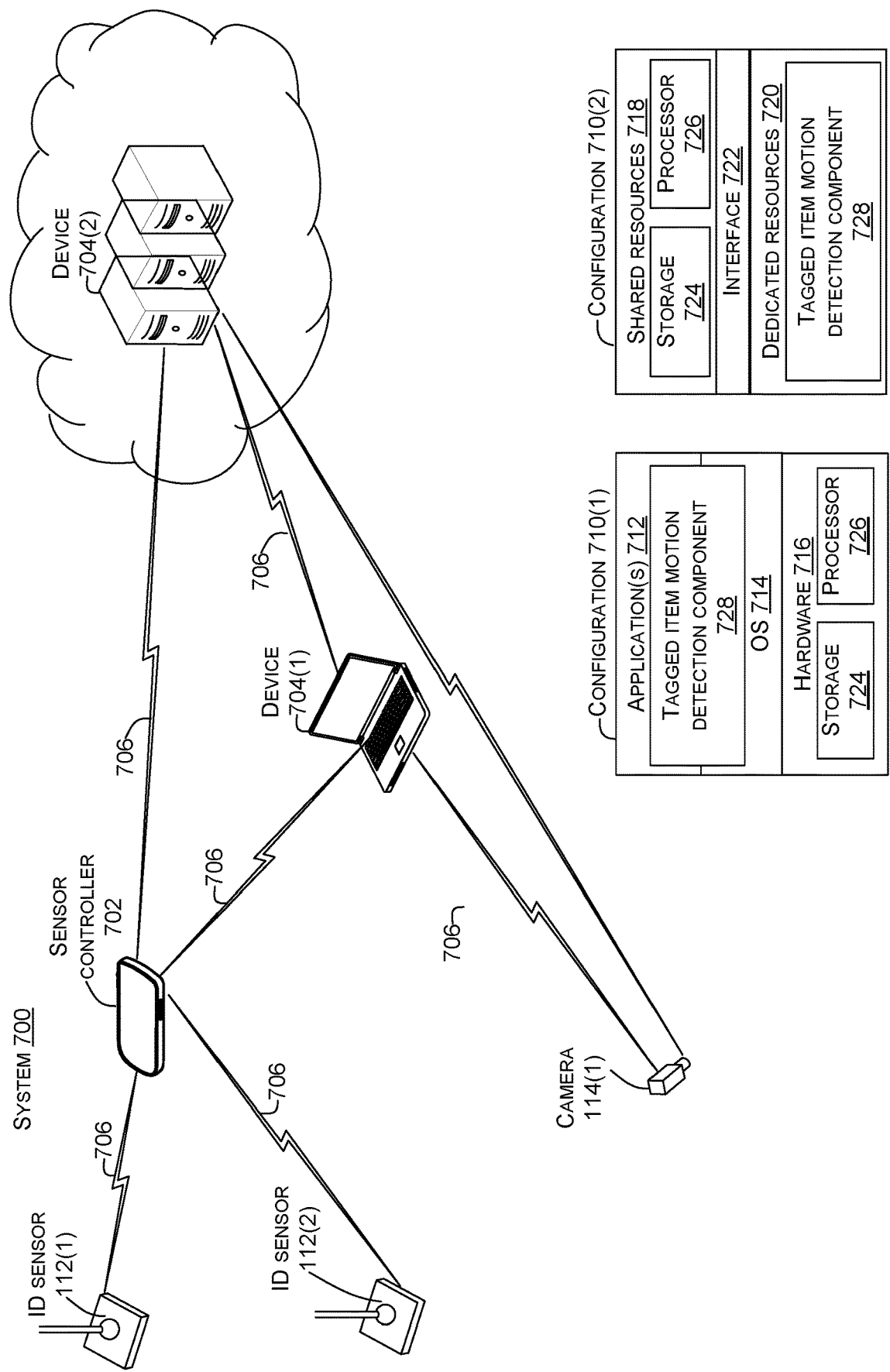
FIG. 7 shows an example inventory control system in accordance with some implementations of the present concepts.

FIG. 7 shows a system 700 that can accomplish inventory control concepts. For purposes of explanation, system 700 includes multiple ID sensors 112 and multiple cameras 114. System 700 also includes a sensor controller 702. In implementations where the ID sensors are manifest as RFID antennas, the sensor controller can be an RFID reader. The RFID reader can coordinate operations of the RFID antennas, such as when each RFID antenna transmits and at what power it transmits. System 700 can also include one or more devices 704. In the illustrated example, device 704(1) is manifest as a notebook computer device and example device 704(2) is manifest as a server device. In this case, the sensor controller 702 is freestanding. In other implementations, the sensor controller can be incorporated into device 704(1). The ID sensors 112, camera 114, sensor controller 702, and/or devices 704 can communicate via one or more networks (represented by lightning bolts 706) and/or can access the Internet over the networks. In some cases, parentheticals are utilized after a reference number to distinguish like elements. Use of the reference number without the associated parenthetical is generic to the element. As illustrated relative to FIGS. 1A-1D, the ID sensors 112 and cameras 114 are proximate to the inventory control environment. Sensor controller 702 and/or devices 704 can be proximate to the inventory control environment or remotely located. For instance, in one configuration, device 704(1) could be located proximate to the inventory control environment (e.g., in the same building), while device 704(2) is remote, such as in a server farm (e.g., cloud-based resource).

FIG. 7 shows two device configurations 710 that can be employed by devices 704. Individual devices 704 can employ either of configurations 710(1) or 710(2), or an alternate configuration. (Due to space constraints on the drawing page, one instance of each configuration is illustrated rather than illustrating the device configurations relative to each device 704). Briefly, device configuration 710(1) represents an operating system (OS) centric configuration. Configuration 710(2) represents a system on a chip (SOC) configuration. Configuration 710(1) is organized into one or more applications 712, operating system 714, and hardware 716. Configuration 710(2) is organized into shared resources 718, dedicated resources 720, and an interface 722 there between.

In either configuration 710, the device can include storage/memory 724, a processor 726, and/or a tagged item motion detection component 728. The tagged item motion detection component 728 can include a tagged item motion algorithm that can detect motion patterns from data sensed by subsets of ID sensors 112.

The tagged item motion detection component 728 can be configured to detect when a tagged item is removed from a shared space. For instance, the tagged item motion detection component 728 can utilize data sensed by a sub-set of ID sensors 112 associated with a shared space at which the tagged item is located. The tagged item motion detection component 728 can be configured to process images from the set of cameras 114 to identify users in the inventory tracking environment. The tagged item motion detection component 728 can be configured to correlate locations of the ID tagged inventory item to simultaneous locations of the users.

In some configurations, each of devices 704 can have an instance of the tagged item motion detection component 728. However, the functionalities that can be performed by tagged item motion detection component 728 may be the same or they may be different from one another. For instance, in some cases, each device's tagged item motion detection component 728 can be robust and provide all functionality described above and below (e.g., a device-centric implementation). In other cases, some devices can employ a less robust instance of the tagged item motion detection component 728 that relies on some functionality to be performed remotely. For instance, device 704(2) may have more processing resources than device 704(1). In such a configuration, training data from ID sensors 112 may be sent to device 704(2). This device can use the training data to train the tagged item motion detection algorithm. The tagged item motion detection algorithm can be communicated to device 704(1) for use by tagged item motion detection component 728(1). Then tagged item motion detection component 728(1) can operate in real-time on data from ID sensors 112 to identify when an individual shopper is in possession of an individual tagged item. Similarly, identification of users within the inventory control environment can be accomplished with data from cameras 114 through biometric analysis and/or comparison to stored data about the users. This aspect can be accomplished by tagged item motion detection component 728 on either or both of devices 704(1) and 704(2). Finally, correlation of tagged items to identified users can be accomplished by tagged item motion detection component 728 on either or both device 704.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 704 can include traditional computing devices, such as personal computers, desktop computers, servers, notebook computers, cell phones, smart phones, personal digital assistants, pad type computers, mobile computers, cameras, appliances, smart devices, IoT devices, etc. and/or any of a myriad of ever-evolving or yet to be developed types of computing devices.

As mentioned above, configuration 710(2) can be thought of as a system on a chip (SOC) type design. In such a case, functionality provided by the device can be integrated on a single SOC or multiple coupled SOCs. One or more processors 726 can be configured to coordinate with shared resources 718, such as memory/storage 724, etc., and/or one or more dedicated resources 720, such as hardware blocks configured to perform certain specific functionality. Thus, the term "processor" as used herein can also refer to central processing units (CPUs), graphical processing units (GPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Various examples are described above. Additional examples are described below. One example includes a system comprising a set of ID sensors for sensing tagged items in an inventory tracking environment, a first subset of the ID sensors sensing a first shared space in the inventory tracking environment, and a second different subset of ID sensors sensing a second shared space in the inventory tracking environment, a set of cameras positioned relative to the inventory tracking environment, a first subset of the cameras imaging the first shared space in the inventory tacking environment, and a second different subset of the cameras imaging the second shared space in the inventory tracking environment, and a processor configured to detect from data sensed by the set of ID sensors, when an ID tagged inventory item is removed from the first shared space, the processor further configured to process images from the set of cameras to identify users in the inventory tracking environment, the processor further configured to correlate locations of the ID tagged inventory item to simultaneous locations of the users.

Another example can include any of the above and/or below examples where the system further comprising storage configured to store data sensed by the set of ID sensors.

Another example can include any of the above and/or below examples where the processor is configured to employ a tagged item motion machine learning algorithm on the stored data that is trained with verified instances where users removed ID tagged inventory items from the shared space.

Another example can include any of the above and/or below examples where the verified instances are verified by the users as part of a check-out process.

Another example can include any of the above and/or below examples where the processor is configured to track locations of the ID tagged inventory item from the shared space to another shared space using doppler shift to determine whether the ID tagged inventory item is moving toward or away from an individual ID sensor.

Another example can include any of the above and/or below examples where individual cameras of the set of cameras are visible light camera, 3D cameras, and or IR cameras.

Another example can include any of the above and/or below examples where individual ID sensors of the set of cameras are configured to emit and receive a single power level in a given time period.

Another example can include any of the above and/or below examples where individual ID sensors of the set of ID sensors are configured to emit and receive at multiple different power levels in a given time period.

Another example can include any of the above and/or below examples where the first shared space is adjacent to the second shared or where the first shared space and the second shared space are physically separated from one another.

Another example comprises recording values from RFID antennas that sense a shared space that includes an RFID tagged inventory item, detecting a triggering event associated with the RFID tagged inventory item relative to the shared space, reviewing the recorded values from a time period preceding the triggering event, identifying recorded values associated with movement of the RFID tagged inventory item within the shared space in the time period, and utilizing the identified recorded values associated with the movement to detect subsequent movement of an additional RFID tagged inventory item in the shared space.

Another example can include any of the above and/or below examples where the triggering event is an absence of the RFID tagged inventory item in the shared space.

Another example can include any of the above and/or below examples where the triggering event is detection of the RFID tagged inventory item in a second different shared space.

Another example can include any of the above and/or below examples where the identifying recorded values comprises detecting when a user picks up the RFID tagged inventory item and returns the RFID tagged inventory item and detecting alternatively when the user picks up the RFID tagged inventory item and adds the RFID tagged inventory item to a physical shopping cart associated with the user.

Another example can include any of the above and/or below examples where the detecting alternatively comprises detecting movement of the user and the RFID tagged inventory item out of the shared space.

Another example can include any of the above and/or below examples where the utilizing comprises utilizing the identified recorded values associated with the movement as training data for a tagged item motion machine learning algorithm that detects the subsequent movement of an additional RFID tagged inventory item in the shared space Another example can include any of the above and/or below examples where the utilizing comprises utilizing the identified recorded values associated with the movement to pattern match with values from RFID antennas during the subsequent movement of the additional RFID tagged inventory item in the shared space Another example includes an inventory control method comprising identifying users in an inventory tracking environment, tracking locations of identified users in the inventory tracking environment, sensing RFID tagged inventory items with RFID antennas that sense shared spaces within the inventory tracking environment, utilizing machine learning that collectively evaluates signal strengths from the RFID antennas associated with the shared spaces over time to determine locations of the RFID tagged inventory items, employing the machine learning to establish that an individual user is in possession of an individual RFID tagged inventory item and is leaving the inventory tracking environment with the individual RFID tagged inventory item, verifying that the user is in possession of the individual RFID tagged inventory item when leaving the inventory tracking environment, repeating the employing and the verifying for multiple individual users and multiple individual RFID tagged inventory items, and when agreement between the employing and the verifying exceeds a predefined threshold, eliminating the verifying and relying on the employing for inventory control.

Another example can include any of the above and/or below examples where the verifying comprises checking out the user at a check stand or kiosk.

Another example can include any of the above and/or below examples where the identifying comprises identifying the users by communicating with devices associated with the users and wherein the devices are employed at checkout.

Another example can include any of the above and/or below examples where repeating the employing and the verifying provides training data from the machine learning.

Another example can include any of the above and/or below examples where the utilizing distinguishes movement of the RFID tagged inventory items when the users pick up the RFID tagged inventory items and return the RFID tagged inventory items from movement of the RFID tagged inventory items when the users pick up the RFID tagged inventory items and leave the shared spaces with the RFID tagged inventory items.

CONCLUSION

Although the subject matter relating to inventory control has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
a set of RFID antennas for sensing RFID tagged inventory items in an inventory tracking environment, a first subset of the RFID antennas sensing a first shared space in the inventory tracking environment, and a second different subset of RFID antennas sensing a second shared space in the inventory tracking environment;
a set of cameras positioned relative to the inventory tracking environment, a first subset of the cameras imaging the first shared space in the inventory tracking environment, and a second different subset of the cameras imaging the second shared space in the inventory tracking environment; and,
a processor configured to cause data sensed by the first subset of the RFID antennas to be recorded, detect when an RFID tagged inventory item is in the second shared space and is no longer in the first shared space, responsive to detecting the RFID tagged inventory item is no longer in the first shared space, analyze the recorded data to identify an action performed on the RFID tagged inventory item in the first shared space, the analyzed recorded data including recorded data for a period of time preceding the detecting, the processor further configured to process images from the set of cameras to detect users in the inventory tracking environment and correlate locations and velocity of the RFID tagged inventory item to simultaneous locations and velocities of the detected users, based at least in part upon Doppler shift observed by at least some of the set of RFID antennas.

2. The system of claim 1, further comprising storage configured to record data sensed by the set of RFID antennas as instructed by the processor.

3. The system of claim 2, wherein the processor is configured to employ a tagged item motion machine learning algorithm on the recorded data that is trained with verified instances where users removed RFID tagged inventory items from the first shared space.

4. The system of claim 3, wherein the verified instances are verified by the users as part of a check-out process.

5. The system of claim 1, wherein the processor is configured to track locations of the RFID tagged inventory item from the first shared space to the second shared space using Doppler shift to determine whether the RFID tagged inventory item is moving toward or away from an individual RFID antenna.

6. The system of claim 1, wherein individual cameras of the set of cameras are visible light cameras, 3D cameras, and or IR cameras.

7. The system of claim 1, wherein individual RFID antenna of the set of the RFID antenna are configured to emit and receive a single power level in a given time period.

8. The system of claim 1, wherein individual RFID antenna of the set of the RFID antenna are configured to emit and receive at multiple different power levels in a given time period.

9. The system of claim 8, wherein the first shared space is adjacent to the second shared space or where the first shared space and the second shared space are physically separated from one another.

* * * * *